May 13, 1969 JAMES E. WEBB 3,444,380
ADMINISTRATOR OF THE NATIONAL AERONAUTICS
AND SPACE ADMINISTRATION
ELECTRONIC BACKGROUND SUPPRESSION METHOD AND APPARATUS
FOR A FIELD SCANNING SENSOR
Filed Oct. 26, 1966

INVENTORS
Richard F. Maxwell, Jr. &
Richard F. Higby
BY
ATTORNEYS

INVENTORS
Richard F. Maxwell, Jr. &
Richard F. Higby

BY John C. Cary
Earl Levy

ATTORNEYS 3,444,380

ELECTRONIC BACKGROUND SUPPRESSION METHOD AND APPARATUS FOR A FIELD SCANNING SENSOR

James E. Webb, Administrator of the National Aeronautics and Space Administration with respect to an invention by Richard F. Maxwell, Jr., Baltimore, and Richard F. Higby, Severna Park, Md.

Filed Oct. 26, 1966, Ser. No. 590,145
Int. Cl. H01j *39/12*
U.S. Cl. 250—209 16 Claims

ABSTRACT OF THE DISCLOSURE

A method and apparatus for detecting a point source in a field of view which includes extended area bodies. The method uses the concept of dividing the field of view into a matrix in which fields of view are compared to determine the existence of a point source. The apparatus for carrying out this method includes a delay line used in conjunction with the comparison circuits to pass desired point target signals and inhibit signals generated by extended areas.

The invention described herein was made in the performance of work under a NASA contract and is subject to the provisions of Section 305 of the National Aeronautics and Space Act of 1958, public law 85–568 (72 Stat. 435; 42 USC 2457).

This invention relates to detecting a point target in a field of view and more particularly to a method and apparatus for detecting point target and rejecting extended area targets in a field of view.

Tracking is the detection and the following of a target through a field by the use of an appropriate means. The target may be a rocket or a plane; the field may be the sky; and the means may be radar. Radar is the transmitting of a radio frequence (RF) signal from a station and the reception by the station of signal echoes. A comparison of the magnitude, phase, and frequency of the received signal with respect to the transmitted signal is used to track the target.

While radar has found widespread use in the tracking of flying targets, it has certain disadvantages when the target is a spacecraft that is reentering the earth's atmosphere. A re-entering spacecraft dissipates a certain amount of kinetic energy as heat. The temperature created by this dissipation is sufficiently high to cause the dissociation and ionization of the air surrounding the spacecraft. This dissociation and ionized air is highly conductive resulting in the attenuation or blackout of RF signals. Hence, the craft does not echo RF signals and radar tracking is lost.

The foregoing phenomena, which severely limits the radar tracking of the re-entry vehicle, also manifests itself in the form of an increased infrared radiation (IR). This increased IR can be detected by IR detecting devices. Thus, IR tracking is used during the blackout period to augment radar tracking. IR systems track the angle of re-entry by following the IR radiation generated by the vehicle to provide angle position date for immediate reacquisition by the radar tracking system following blackout. It is with such a system that this invention is primarily concerned. Specifically, the invention is primarily concerned with a tracking device for determining the position of a target in a field and with the suppression of signals emitted from false targets located in the field; particularly false targets having an extended area. Further, while the invention has its primary utility in the IR tracking of space vehicles it is to be understood that the source of radiation does not have to be IR but may be other radiation—visible light, for example.

The prior art has utilized various spatial discrimination approaches to exploit the characteristic differences between the signals generated by a point target and the signals generated by larger area tragets. These prior art approaches have been generally designated as: spatial filtration; pulse length discrimination; area cancellation; and space correlation.

Spatial filtration uses a reticle with a suitable pattern of many small transparent and opaque apertures. In theory a point target is smaller than the apertures and as it crosses the reticle it generates an electronic signal at a finite frequency determined by the rate of crossing. However, extended area targets, such as clouds, will fill many apertures and by appropriate means they can be diluted and averaged out. In this manner signals from false targets are eliminated. The primary disadvantage of this system is that there is a 50% loss in target energy due to the opaque apertures. Further, the system is susceptible to false signals which occur when a cloud edge passes over the reticle, for example.

Pulse length discrimination is the scanning of a scene and the generation of an electrical wave train whose component amplitudes and widths are proportional to the intensity and dwell time of both point and extended area targets imagined along the line of scan. According to the theory of operation, point targets will generate narrow pulse widths while extended area targets will generate wide pulse widths. Electronic filtering is then used to accept the point target wave shape and reject all other wave shapes. This technique has the disadvantage of only discriminating in one dimension—along the line of scan.

Area cancellation is similar to spatial filtration except that it employs a detector or whose geometry provides the recticle function. The detector is divided into small detector elements each comparable in size to the small transparent and opaque apertures of the spatial filtering reticle. Where, in the spatial filtration case, apertures are alternately transparent and opaque, area cancellation detecting apertures are biased alternately positive and negative. When the image of a point source moves across the detector a wave train of positive and negative pulses is generated. The frequency of this signal is dependent on the velocity of movement and the size of the detector elements. When an extended area background source is moved across the detector as many positive elements as negative elements are, on the average, illuminated and two opposing induced signals are generated. These signals cancel one another. The primary disadvantage of this technique is that it is restricted by the fabrication geometries of state of the art detectors. Further, electronically, it is highly complex.

Space correlation is a method wherein a field element or ensemble of field elements is compared with its neighbor elements in some space relationship to determine the degree of similarity. For example, the radiation impinging on each point (reference point) could be compared with the radiation impinging on each immediately adjacent point (sample point) surrounding the reference point. If any one of the sample points have the same impinging radiation as the reference point, the reference point would be rejected as an extended area. If none of the sample points have the same impinging radiation as the reference point, it will be accepted as a point source. However, unless the reference point and the sample points are simultaneously viewed by separate detectors, some memory system is required to store radiation values so that a simultaneous comparison of the points of interest may be made. Hence, the system is extremely complex and requires the use of a memory system. Moreover, this type of system employs an analogue approach thereby making is susceptible to noise.

While each of the foregoing approaches have certain advantages they also have disadvantages which make them not entirely suitable for tracking a re-entering space vehicle. In addition to the specific disadvantages pointed out above, they generally require complex electronic systems. Further, these techniques do not reject background signals on a go/no-go basis but absorb all signals and then attempt to select certain signals; because of this approach these prior art systems are susceptible to false alarms.

Therefore, it is an object to provide a new and improved method of suppressing false target signals in a tracking device.

It is also an object to provide a new and improved method of suppressing false target signals in a tracking device wherein a point target is tracked as it moves across a field of view.

It is a further object of this invention to provide a new and improved apparatus for suppressing false target signals in a tracking device.

It is a still further object of this invention to provide a new and improved apparatus for suppressing false target signals in a tracking device wherein a point target is tracked as it moves across a field of view.

It is still another object of this invention to provide a new and improved method and apparatus that is simple, uncomplicated and suppresses false target singals in an IR tracking device.

In accordance with a principle of the invention digital space correlation is used to suppress false target signals in a point target tracking device. One method comprises the steps of: bisecting a search field of view into a matrix of rows and columns of elemental fields of view; examining each elemental field of view to determine if a target exists in that field; comparing matrix neighbors to determine if target signals exist in adjacent elemental fields; and rejecting a signal if its adjacent matrix neighbors contain signals. If none of the neighboring elements possesses a signal the signal is accepted as that due to a point source target.

In accordance with a further principle of the invention the foregoing method is carried out by providing an apparatus wherein a row of photodetector elements is sequentially moved across the face of the search field. At each sequential location, the row of detectors is scanned to determine if a target is impinging on any detector. If a target is impinging on a detector it generates a digital signal that is applied to a delay line having a plurality of outputs. In timed relationship these outputs are compared to determine if adjacent detectors have detected signals; if adjacent detectors have also detected signals the signal is rejected.

A modification of the foregoing method includes first and second comparison steps in lieu of the single comparison step. The first step is a comparison of each elemental field of view in a row with an adjacent element on one side and an element one element field of view removed on the other side. If a target signal exists in all three elemental fields of view it is rejected. The second step is a similar comparison in each row. That is, each element is compared with an adjacent element on one side and an element one elemental field of view removed on the other side. If a target signal exists in all three elements it is rejected. Only after a particular element has passed both comparison tests is it finally accepted as a true point target.

In accordance with a still further principle of the invention the foregoing modified method is carried out by applying signals from a sequentially moved row of photodetectors to an electronic system including a pair of delay lines. In this instance the outputs from the delay lines are compared to determine if signals are coming from the specific three elemental fields described in the foregoing modified method.

It will be appreciated that the invention is a simple method and a similarly simple apparatus for suppressing false extended area targets when scanning a field of view to determine if a point target is located in the field. All that is necessary is that the field be scanned to determine if a target is in any element of the field. If so a digital signal is generated. This signal is compared, through the use of a simple delay line, with certain neighboring element areas. If these neighbors do not generate signals the initial signal is a point source. Due to the use of a digital apparatus a very simple go/no-go device has been provided. It will be further appreciated that a digital device is less susceptible to false target indications due to noise and internal system generated signals than is an analogue device. Hence, the invention includes a simple method of false target rejection as well as a simple apparatus for carrying out the method.

The foregoing objects and many of the attendant advantages will become more readily appreciated as the same becomes better understood by reference to the following detailed description when taken in conjunction with the accompanying drawings wherein.

Figure 1A:
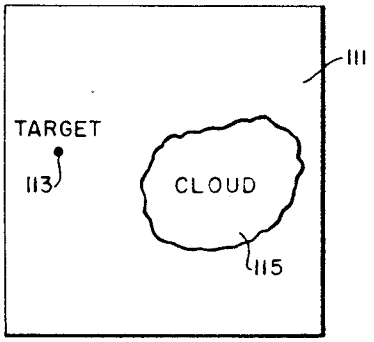
FIG. 1 (A–D) illustrates the overall matrix concept of the invention.

FIG. 1A illustrates a search field 111 containing a target 113 and a cloud 115. The target represents the point target to be tracked while the cloud represents an extended area false target.

Figure 1B:
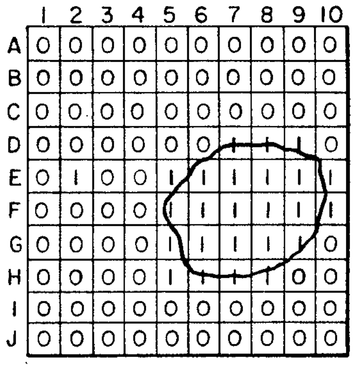

FIG. 1B illustrates the same scene as FIG. 1A with a space matrix superimposed thereover; digital values have been assigned to the various elements of the space matrix. That is, the elements containing no target have been designated as zero; and the elements wherein a significant amount of a target exists have been designated as ones.

Figure 1C:
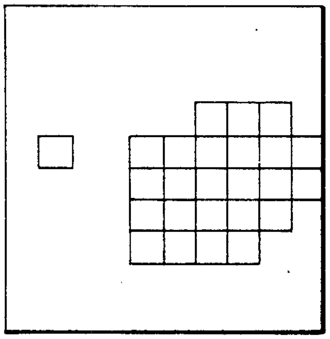

In FIG. 1C all the zero elements have been eliminated. In accordance with one method of the invention adjacent elements of the space matrix are compared to determine if adjacent elements have targets. If adjacent elements have targets they are eliminated. In accordance with this method the portion of the space matrix covering the cloud 15 will be eliminated. Only the individual space covering the target 13 has the desired non-adjacent condition.

Figure 1D:
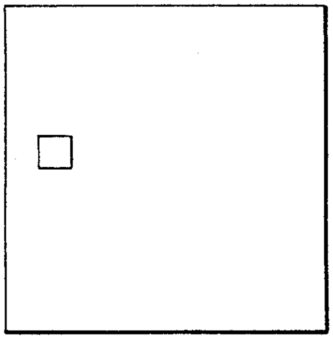

FIG. 1D illustrates the field of view after the matrix elements have been compared. Specifically, only the element containing the point target remains.

The digital logic approach of the invention results in a method of discrimination that is insensitive to amplitude. As a consequence, an extended area target is rejected regardless of its specific intensity as seen from the matrix. However, it is necessary that the intensity exceed a threshold value so that appropriate steps can be taken to prevent noise from providing erroneous signals to the apparatus of the invention.

While the target can never be seen in front of an extended area target by the same token, target intensity distributions within the extended area target which might induce signals similar to a point source will never cause a false alarm. Hence, by utilizing this tracking system in a plane located above the normal cloud cover, a system is provided that is readily adapted to tracking a space vehicle through the blackout period. Specifically, above the normal cloud overcast a few small clouds and other extended area targets exist; however, the foregoing method does not allow these targets to be indicated as the point target. Even though blanking will occur when the vehicle passes in front or in back of a cloud this method will not degrade the ability to detect the vehicle when it is past the cloud. Further, the method of the invention eliminates false alarms caused by point targets contained in the cloud; that is, it will eliminate false alarms caused by high intensity distributions in an extended area target.

Figure 2:
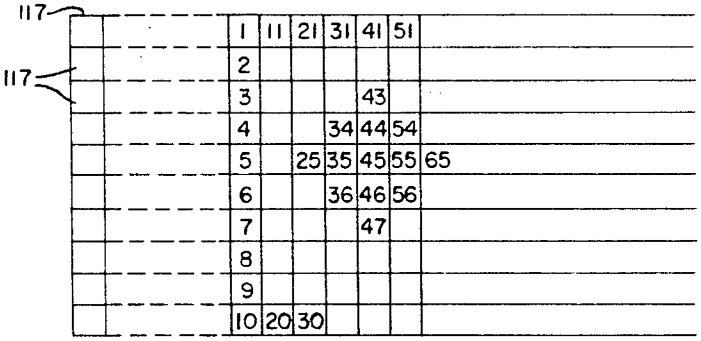
FIG. 2 illustrates the movement of a plurality of photocells across the surface of a field of view.

Turning now to one preferred embodiment of the means for carrying out the digital space correlation method of the invention; FIG. 2 illustrates a matrix of the type illustrated in FIG. 1 wherein each element of the search field is designated by a specific numeral. Specifically, the space field matrix is arrayed in a plurality of columns each column is designated with ten numerals; the first column is designated with the numerals 1 through 10, the second 11 through 20, the third 21 through 30 etc. FIG. 2 also illustrates ten IR detecting photocells 117. These photocells are mounted in a column and adapted to sequentially sample the rows of the matrix. That is, these photocells first intersect radiation impinging on any matrix elements in the first column then the second column, then the third column, etc.

The column of detector elements 117 illustrated in FIG. 2 can be moved across the space field in various manners. For example, the column can be moved by a mechanical system. Or, the column array can be stationary with a movable mirror or mirrors used to reflect the impinging radiation from the individual columns of the array to the cells in a sequential manner. Or, the column 117 could be an entire matrix of photocells superimposed over the space matrix and electronically moved. Hence, there are numerous means for carrying out the "movement" of the column across the space field.

By various well known means the photocells are sampled when they are receiving impinging radiation from the first column of matrix elements. This sampling may be from top to bottom, for example. Thereafter, the second column is sequentially sampled from top to bottom and so on. In this manner the matrix array is sequentially sampled from the first element in the upper lefthand corner to the last element in the lower righthand corner. When a particular element is sampled and target radiation of sufficient value is impinging on the element the photocell sampling that element will emit a signal pulse. If no radiation or only a very low amount of radiation is impinging on a photocell the cell's output will be rejected as too low.

Figure 3:
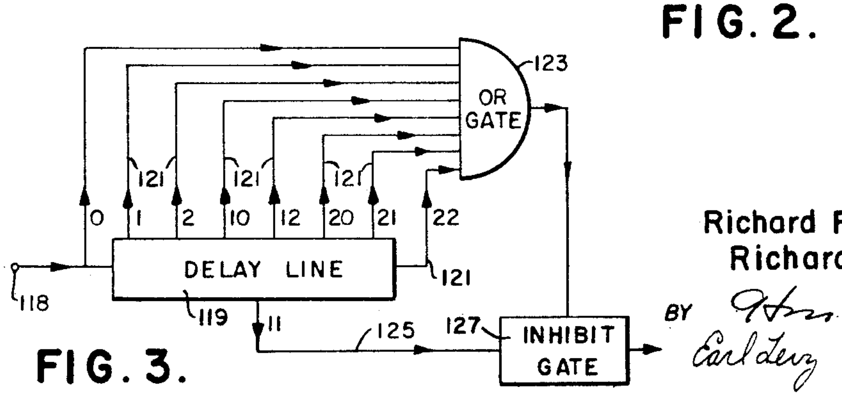
FIG. 3 is a block diagram illustrating one type of a delay line system made in accordance with the invention.

The pulses are applied to an input 118 of a delay line 119 illustrated in FIG. 3. The delay line has seven outputs 121 all applied to an OR gate 123. In addition, the input at terminal 118 is applied to the OR gate 123. The output from the OR gate 123 is applied to the inhibit input of an inhibit gate 127. Further, a signal output 125 from the delay line is coupled to the signal input of the inhibit gate 127.

The delay outputs are at particular points along the delay line 119 as determined by the following relationship. For example, as illustrated in FIG. 2, consider element 45 as the element of interest. There are eight adjacent elements to this particular element; these are 34, 35, 36, 44, 46, 54, 55, and 56. Hence, the first adjacent element is designated 34 and the last adjacent element is designated 56. There is a particular relationship between element 45 and each of its adjacent elements. This relationship can best be illustrated by subtracting each elemental designation from the last or highest elemental designation. The following table does this:

| | | | | | | | | | |
|---|---|---|---|---|---|---|---|---|---|
| Last Element | 56 | 56 | 56 | 56 | 56 | 56 | 56 | 56 | 56 |
| Space Element | 34 | 35 | 36 | 44 | 45 | 46 | 54 | 55 | 56 |
| Space Difference | 22 | 21 | 20 | 12 | 11 | 10 | 2 | 1 | 0 |

It will be appreciated that this space difference is a fixed element space difference and exists between any element of interest and its surrounding adjacent elements. Because of the sequential timing the same relationship exists in time.

The seven inputs to the OR gate 123 from the delay line and the input from the input 118 are designated as the above space relationship; however, in actuality it is a time relationship. Since the signal output 125 is applied to the signal input of the inhibit gate, and since the output from the OR gate 123 is applied to the inhibit input of the inhibit gate 127, when there is a signal correspondence between one input to the OR gate and the signal output 125 the inhibit gate will prevent the signal output 125 from passing through it. This correspondence only occurs for signals from the elements surrounding the element of interest. For example, if elements 45 and 56 have radiation impinging on them the OR gate will receive a signal on the O line when the signal from element 45 reaches the 11 line; that is, the OR gate will provide an inhibiting signal when the signal from element 45 reaches the signal output 125 from the delay line. Hence, no signal is passed through the inhibit gate. In this manner a simple delay line is utilized to correlate signals between adjacent elements of the space matrix. Specifically, each individual element of the space matrix is related to each other element in accordance with the foregoing subtraction. By utilizing a delay line of appropirate interval delays, an appropriate timed relationship is presented.

While the foregoing method and apparatus will operate satisfactorily to reject signals from extended area targets and pass signals from point targets in some cases it is unsuitable because a point target could be located on one of the lines connecting two elements or on a point connecting four elements. In those instances the delay line logic illustrated in FIG. 3 would reject the target; this may be undesirable. Hence, it is necessary to provide for a system that allows the radiation from a point target to impinge on two vertical elements and/or two horizontal elements. The logic of a preferred system to perform this modified method is illustrated in FIG. 4.

Figures 4, 5, 6:
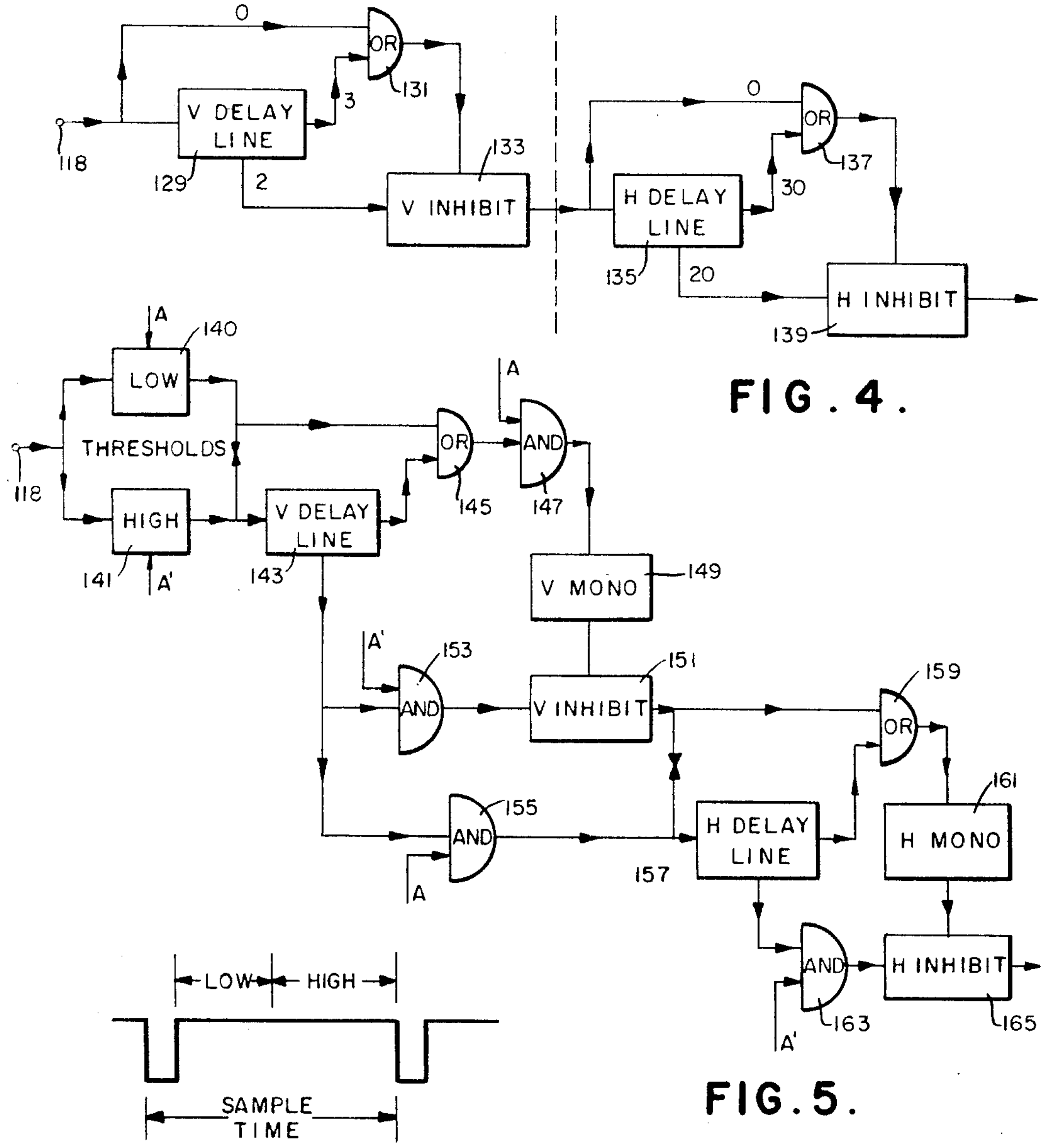
FIG. 4 is a block diagram illustrating a second type of the delay line system made in accordance with the invention.
FIG. 5 is a block diagram illustrating still another type of delay line system made in accordance with the invention.
FIG. 6 is a timing diagram illustrating the sample periods for the block diagram of FIG. 5.

The system illustrated in FIG. 4 allows the passage of signals that originate from a single matrix element, a pair of adjacent matrix elements or four matrix elements when the four elements comprise a square. However, when three adjacent elements in either a row or a column are signal originators they are rejected and when adjacent elements form a larger than four square configuration their signals are rejected. Hence, a point source can impinge on the intersection of two adjacent or, four squarely adjacent matrix elements and not be rejected. Because a single delay line that would operate under these conditions is impractical with the present state of the art delay lines, a system of the type illustrated in FIG. 4 is used. That is, two separate delay lines, one directed to a vertical delay and the other directed to a horizontal delay with appropriate logic for each delay system is used.

The vertical portion of the delay line logic is illustrated to the left in FIG. 4 and comprises a vertical delay line 129, an OR gate 131, and a vertical inhibit gate 133. The input at terminal 118 is applied to the vertical delay 129 and to one input of the OR gate 131. The signal output from the vertical delay line is two timing periods delayed from the input and is applied to the signal input of the inhibit gate 133. A second output from the delay line three timing intervals delayed from the input is applied to the second input of the OR gate. The output from the OR gate is applied to the inhibit input of the inhibit gate 133. By this connection when two vertical signals, spaced apart by an intervening element, are detected an inhibiting condition exists and no signal is passed through the vertical inhibit gate 133. However, if only two adjacent signals are detected one signal will be passed by the vertical inhibit gate. Specifically, consider the elements 45 and 46 in the vertical array illustrated in FIG. 2 as those originating signals. When the signal from element 45 reaches the signal output from the delay line it will pass because no signals will be on the inputs to the OR gate; that is, outputs 44 and 47 (the 0 and 3 condition inputs to the OR gate of FIG. 4) present no signals. However. when the signal from element 46 reaches the signal output of the vertical delay line it will not pass because the signal from element 45 will then be on the second output of vertical delay line and present an input to the OR gate. This signal will pass through the OR gate to the inhibit input of the vertical inhibit gate 133. Hence, only one signal will be passed through the vertical delay section even though it impinges on two elements.

The rejection for a three adjacent element signal originating condition is similar; assume elements 44, 45, and 46 are the elements originating the signals. When the signal from element 44 reaches the signal output of the vertical delay line 129 the signal from element 46 will be on the input line to inhibit it; when the signal from element 45 reaches the signal output from the vertical delay line the signal from element 44 will be on the second output of the delay line to inhibit it and when the signal from element 46 reaches the signal output from the vertical delay line the signal from element 45 will be on the second output of the delay line to inhibit it. Hence, a three adjacent element signal originating condition results in a rejection of all signals.

Turning now to the horizontal section illustrated on the right in FIG. 4, that section comprises a horizontal delay line 135, an OR gate 137, and a horizontal inhibit gate 139. The output from the vertical inhibit gate 133 is connected to the input of the horizontal delay line 135, it is also connected to one input of the OR gate 137. The signal output from the horizontal delay line is connected to the signal input of the horizon'al inhibit gate 139. A second output from the horizontal delay line is connected to the second input of the OR gate 137; and the output from the OR gate is connected to the inhibit input of the horizontal inhibit gate 139. The second input to the OR gate 137 is 30 timing pulses displaced from the first input. The input to the horizontal inhibit gate 139 from the horizontal delay line 135 is displaced 20 timing intervals from the input to the horizontal delay line. This interval displaying allows a passing of two horizontally adjacent signals but a rejection of three or more horizontally adjacent signals; that is, signals that originate at horizontally adjacent elements. Specifically, assume elements 45 and 55 in the horizontal direction as those elements originating signals. Further, assume that the signals have not been rejected by the vertical logic. When the signal from element 45 is on the signal input to the horizontal inhibit gate because of the timing relationship no signal will be on either input to the OR gate 137 hence the signal from element 45 will pass through the horizontal inhibit gate 139. However, when the signal from element 55 is on the input to the horizontal inhibit gate it will not pass because the signal from element 45 is on the second input to the OR gate and provides a signal to the inhibit input of the horizontal inhibit gate. Hence, this system operates similarly to the vertical delay logic and only one signal is passed through the horizontal inhibit gate 139. In a manner also similar to the vertical logic description no signal is passed when three adjacent horizontal elements originate signals.

It will be appreciated from the foregoing that if a signal is on the square 45, 46, 55, and 56 one signal will be passed through the overall logic. That is, element 45 will be indicated as the one containing a target signal. In the foregoing manner the logic illustrated in FIG. 4 accomplishes the desired result. That is, the logic allows a point target to impinge on two adjacent or four square elements and create one signal that is passed as a point source. However, if more than four elements receive impinging radiation no signal is passed.

While the logic illustrated in FIG. 4 is operable it could indicate a point target when none exists. That is, if the edge of an extended area target were residing in two of the vertical elements of one column an indication would be passed by the vertical delay line. Moreover, an indication could also be passed in the horizontal direction even though the extended area target extended numerous columns over. Hence, the edge of the extended area target could indicate an erroneous point source. More specifically, if the extended area edge passed through two elements of one vertical column and then extended to the right a signal would be passed from that column. However, when the next sequential column (assuming movement to the right) was reached no signal would be passed because more than three elements are originating signals. Hence, no inhibiting signal would be presented to the horizontal logic and a false point target signal would be indicated.

The series-parallel system illustrated in FIG. 5 overcomes the problem of FIG. 4. That is, it eliminates the detection of the edge of a large source. In addition, the system illustrated in FIG. 5 also provides low level and high level threshold gates. The use of two threshold gates eliminates the problem caused by a point target occurring in the middle of a large area target as well as aids in the elimination of large area target edges generating erroneous point source signals. More specifically, as to the former, if an extended area target had a large point source profile in the middle of it, it could be erroneously detected as a point target if just one threshold gate is used and the intensity level of the majority of the extended area target is below the threshold of the single threshold gate. The two threshold detectors illustrated in FIG. 5 both connected to the input of the FIG. 5 delay systems eliminate this problem.

The block diagram illustrated in FIG. 5 includes a low level threshold gate 140, a high level threshold gate 141, a vertical delay line 143, a first OR gate 145, a first AND gate 147, a vertical monostable multivibrator 149, a vertical inhibit gate 151, a second AND gate 153, a third AND gate 155, a horizontal delay line 157, a second OR gate 159, a horizontal monostable multivibrator 161, a fourth AND gate 163, and a horizontal inhibit gate 165.

The input signal applied to the input terminal 118 is connected to both the high level threshold detector 140 ad the low level threshold detector 141. The outputs from both threshold detectors are connected both to one input of the first OR gate 145 and the input of the vertical delay line 143. The signal output from the vertical delay line 143 is connected both to one input of the second AND gate 153 and to one input of the third AND gate 155. The second output from the vertical delay line 143 is connected to a second input of the first OR gate 145. The output from the first OR gate 145 is connected to one input of the first AND gate 147; and the output from the first AND gate 147 is connected to the input of the vertical monostable multivibrator 149. The output from the vertical monostable multivibrator is connected to the inhibit input of the vertical inhibit gate 151. The output from the second AND gate 153 is connected to the input of the vertical inhibit gate 151.

The output from the vertical inhibit gate 151 is connected both to one input of the second OR gate 159 and to the input of the horizontal delay line 157; and the output from the third AND gate 155 is connected to the same inputs of the second OR gate 159 and the horizontal delay line 157. The signal output from the horizontal delay line 157 is connected to one input of the fourth AND gate 163. The second output from the horizontal delay line 157 is connected to a second input of the second OR gate 159. The output from the second OR gate 159 is connected to the input of the horizontal monostable multivibrator 161 and the output from the horizontal multivibrator is connected to the inhibit input of the horizontal inhibit gate 165. The output from the fourth AND gate 163 is connected to the signal input of the horizontal inhibit gate 165.

The time relationship of the inputs and outputs of the vertical delay line 143 and the horizontal delay line 157 are the same to those illustrated in FIG. 4 and hence will not be further discussed.

Figure 7:
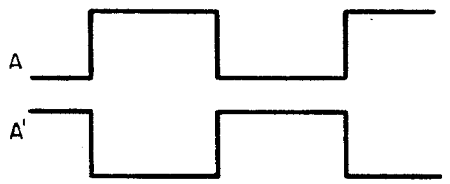
FIG. 7 is a timing diagram illustrating the gate timing of the block diagram illustrated in FIG. 5.

In addition to the foregoing connections various timing signals are applied to both the AND gates and the high and low level threshold gates 140 and 141; these timing relationships are illustrated in FIG. 7. FIG. 6 illustrates the sample time period and is compared with the timing signals illustrated in FIG. 7. During the first part of the sample period the high threshold gate is turned on and the low level threshold gate is turned off. After approximately half of the sample period has elapsed the low level threshold gate is turned on and the high level threshold gate is turned off and remains so for the remainder of the sampling period.

The illustrations of A in FIGS. 5 and 7 are for pulses that are on for the first half of a sample period and off for the second half; and the illustrations of A' in FIGS. 5 and 7 are for pulses that are on for the second half of the sample period and off for the first half. The timing pulses are provided by any appropriate clock source (not shown). The timing pulses A are connected to the timing input of the high threshold gate 140, the first AND gate 147, and the third AND gate 155. The time pulses A' are connected to the timing input of the low threshold gate 141, the second AND gate 153, and the fourth AND gate 163. In this manner the AND gates and the high and low threshold gates are turned on at desired times in a sample period.

The circuit of FIG. 5 operates as follows, if an input signal of a high value occurs it passes through both the high and the low threshold gates 140 and 141. Hence, there is a signal out of the threshold gates for the entire sample period. When this signal reaches the signal output from the vertical delay line 143 it passes through the second AND gate 153 during the second half of a sample period (time A') and is applied to the vertical inhibit gate 151. This signal will pass through the vertical inhibit gate if no signal is on the inhibit input to that gate. In accordance with the FIG. 4 description this inhibit signal could occur only if a target signal had occurred during the immediately preceding sample period or during a following sample period one period removed from the period on the signal output of the vertical delay line. The difference between FIGS. 4 and 5 is that these inhibition signals do not have to be as high as the signal applied to the signal input of the vertical inhibit gate. This is because the vertical inhibit gate is controlled by low level signals. Specifically, only low level signals are passed through the first AND gate 147 because it is timed with the low level threshold gate i.e., it is triggered at time A. The vertical monostable multivibrator 149 merely stretches out these low level signals so that the vertical inhibit gate is inhibited when high level input signals are presented to it i.e., during time A'. In this manner a high point in a low level extended target in the vertical direction is rejected.

The horizontal delay section illustrated to the right of FIG. 5 operates in the same manner and rejects high points in low level extended area targets in the horizontal direction.

Further, edge signals are rejected so that they will not generate false point target indications. The third AND gate 155 passes any low level signal that occurs because it is connected directly to the signal output of the vertical delay line and because it is triggered at the same time the low level threshold gate is triggered i.e., time A. Hence, even though a high level signal is rejected by the vertical delay section, a low level signal is still applied to the horizontal delay section. It is this signal that prevents edges of extended area targets from generating false signals. Specifically, it was previously illustrated that edges when they are in only two elements of one column will create false signals because signals from the next vertical column will be rejected in the vertical delay section and therefore will not reach the horizontal delay section to provide a horizontal inhibit signal. The system of FIG. 5 prevents this by simply passing a low level signal through the third AND gate 155 even though a high level signal has been rejected. Because of the timing this signal can only be used to inhibit and will not be applied to the signal input of the horizontal inhibit gate. More specifically, the fourth AND gate 163 is only timed to pass high level signals; hence, it will not pass the low level inhibit signal.

It will be appreciated that the foregoing has described a simple method of extended area target rejection as well as a simple apparatus for carrying out of the method. Specifically, the method includes applying a matrix over a field of view, sampling each element of the matrix to determine if radiation is impinging on that element, if so a signal pulse is generated. Thereafter pulses are compared to determine if an extended area is the cause of the pulses, if so they are rejected. The apparatus of the invention is similarly simple. The means of detecting impinging radiation are photocells and the means of sequentially sampling is the movement of a row of photocells across the matrix. The signal comparison is performed by the application of the signals from the photocells to delay lines and the timed comparison, in logic gates, of the outputs from the delay lines. Hence, a simple method and apparatus has been described.

While the foregoing description has chosen IR as the radiation being generated by the targets it will be appreciated by those skilled in the art that other sources may be used. For example, the radiation generated by the targets could be visible light or ultraviolet radiation. Hence, the invention may be practiced otherwise than as specifically described herein.

What is claimed is:

1. A method of detecting point target and rejecting extended area targets in a field of view comprising the steps of:

dividing said field of view into a matrix of elemental fields of view;

sampling each elemental field of view to determine if a target exists in any element;

generating an indication of the existence or non-existence of a target for each elemental field of view;

comparing the indication from each elemental field of view with other predetermined elemental fields of view to determine if a point target or an extended area target exists in any elemental fields of view;

accepting indications that indicate point targets; and rejecting indications that indicate extended area targets.

2. The method claimed in claim 1 wherein the indication signal generated by each elemental field of view is compared with the indication signals generated by each immediately adjacent elemental field of view.

3. The method claimed in claim 1 wherein the matrix is a plurality of rows and columns.

4. The method claimed in claim 3 wherein the indication signal generated by each elemental field of view is compared with indication signals generated by each immediately adjacent elemental field of view in the row and column within which the elemental field of view is located.

5. The method claimed in claim 3 wherein the indication signal generated by each elemental field of view is compared with indication signals generated by an adjacent elemental field of view on one side and an elemental field of view one elemental field of view removed on the other side in each row and is compared with indication signals generated by an adjacent elemental field of view one side and an elemental field of view removed on the other side in each column.

6. Apparatus for detecting point targets and rejecting extended area targets in a field of view formed into a matrix of elemental fields of view comprising:

detecting means for sampling each elemental field of view to determine if a target exists in that field and generating an electronic pulse if a target does exist; and comparing means adapted to receive the pulses from said detecting means for comparing said pulses to determine if a target is a point target or an extended area target.

7. Apparatus as claimed in claim 6 wherein said detecting means includes a plurality of photocells.

8. Apparatus as claimed in claim 7 wherein said comparing means includes:

a delay line having an input adapted to receive said pulses, a plurality of outputs and a signal output;

an OR gate having a plurality of inputs;

an inhibit gate having a signal input and an inhibit input;

the plurality of outputs from said delay line connected to the inputs of said OR gate;

the signal output of said delay line connected to the signal input of said inhibit gate; and the output of said OR gate connected to the inhibit input of said inhibit gate.

9. Apparatus as claimed in claim 7 wherein said comparing means includes:

a vertical delay line having an input adapted to receive said pulses, a signal output and a second output;

a first OR gate having two inputs and one output;

one input of said first OR gate adapted to receive said pulses and the second input of said first OR gate connected to the second output of said vertical delay line;

a vertical inhibit gate having a signal input, an inhibit input and an output;

the signal output of said vertical delay line connected to the signal input of said vertical inhibit gate and the output of said first OR gate connected to the inhibit input of said vertical inhibit gate;

a horizontal delay line having an input connected to the output of said vertical inhibit gate, a signal output and a second output;

a second OR gate having two inputs and an output;

one input of said second OR gate connected to the output of said vertical inhibit gate and the second input of said second OR gate connected to the second output of said horizontal delay line;

a horizontal inhibit gate having a signal input, an inhibit input and an output;

the signal output of said horizontal delay line connected to the signal input of said horizontal inhibit gate; and the output of said second OR gate connected to the inhibit input of said horizontal inhibit gate.

10. Apparatus as claimed in claim 9 including:

a high level threshold detector;

a low level threshold detector;

said high and low level threshold detectors connected in parallel between said detecting means and the inputs to said first OR gate and said vertical delay line;

a first AND gate;

a vertical monostable multivibrator;

said first AND gate and said vertical monostable multivibrator connected in series between the output of said first OR gate and the inhibit input of said vertical inhibit gate;

a second AND gate connected between the signal output of said vertical delay line and the signal input of said vertical inhibit gate;

a third AND gate connected between the signal output of said vertical delay lines and the common input to said second OR gate and said horizontal delay line;

a horizontal monostable multivibrator connected between the output of said second OR gate and the inhibit input of said horizontal inhibit gate;

a fourth AND gate connected between the signal output of said horizontal delay line and the signal input of said horizontal inhibit gate;

said low level threshold detector, said first and third AND gates each having an input adapted for connection to a first type clock pulse source; and said high level threshold detector, said second and fourth AND gates each having an input adapted for connection to a second type clock pulse source.

11. Apparatus as claimed in claim 6 wherein said comparing means includes:

a delay line having an input adapted to receive said pulses, a plurality of outputs and a signal output;

an OR gate having a plurality of inputs;

an inhibit gate having a signal input and an inhibit input;

the plurality of outputs from said delay line connected to the inputs of said OR gate;

the signal output of said deay line connected to the signal input of said inhibit gate; and the output of said OR gate connected to the inhibit input of said inhibit gate.

12. Apparatus as claimed in claim 6 wherein said comparing means includes:

a vertical delay line having an input adapted to receive said pulses, a signal output and a second output;

a first OR gate having two inputs and one output;

one input of said first OR gate adapted to receive said pulses and the second input of said first OR gate connected to the second output of said vertical delay line;

a vertical inhibit gate having a signal input, an inhibit input and an output;

the signal output of said vertical delay line connected to the signal input of said vertical inhibit gate and the output of said first OR gate connected to the inhibit input of said vertical inhibit gate;

a horizontal delay line having an input connected to the output of said vertical inhibit gate, a signal output and a second output;

a second OR gate having two inputs and an output;

one input of said second OR gate connected to the output of said vertical inhibit gate and the second input of said second OR gate connected to the second output of said horizontal delay line;

a horizontal inhibit gate having a signal input, an inhibit input and an output;

the signal output of said horizontal delay line connected to the signal input of said horizontal inhibit gate; and the output of said second OR gate connected to the inhibit input of said horizontal inhibit gate.

13. Apparatus as claimed in claim 12 including:

a high level threshold detector;

a low level threshold detector;

said high and low level threshold detectors connected in parallel between said detecting means and the inputs to said first OR gate and said vertical delay line;

a first AND gate;

a vertical monostable multivibrator;

said first AND gate and said vertical monostable multivibrator connected in series between the output of said first OR gate and the inhibit input of said vertical inhibit gate;

a second AND gate connected between the signal output of said vertical delay line and the signal input of said vertical inhibit gate;

a third AND gate connected between the signal output of said vertical delay lines and the common input to said second OR gate and said horizontal delay line;

a horizontal monostable multivibrator connected between the output of said second OR gate and the inhibit input of said horizontal inhibit gate;

a fourth AND gate connected between the signal output of said horizontal delay line and the signal input of said horizontal inhibit gate;

said low level threshold detector, said first and third AND gates each having an input adapted for connection to a first type clock pulse source; and said high level threshold detector, said second and fourth AND gates each having an input adapted for connection to a second type clock pulse source.

14. Apparatus for comparing electronic pulse signals to detect a predetermined correlation comprising:

a delay line having an input adapted to receive said pulses, a plurality of outputs and a signal output;
an OR gate having a plurality of inputs;
an inhibit gate having a signal input and an inhibit input;
the plurality of outputs from said delay line connected to the inputs of said OR gate;
the signal output of said delay line connected to the signal input of said inhibit gate; and
the output of said OR gate connected to the inhibit input of said inhibit gate.

15. Apparatus for comparing electronic pulse signals to detect a predetermined correlation comprising:
a vertical delay line having an input adapted to receive said pulses, a signal output and a second output;
a first OR gate having two inputs and one output;
one input of said first OR gate adapted to receive said pulses and the second input of said first OR gate connected to the second output of said vertical delay line;
a vertical inhibit gate having a signal input, an inhibit input and an output;
the signal output of said vertical delay line connected to the signal input of said vertical inhibit gate and the output of said first OR gate connected to the inhibit of said vertical inhibit gate;
a horizontal delay line having an input connected to the output of said vertical inhibit gate, a signal output and a second output;
a second OR gate having two inputs and an output;
one input of said second OR gate connected to the output of said vertical inhibit gate and the second input of said second OR gate connected to the second output of said horizontal delay line;
a horizontal inhibit gate having a signal input, an inhibit input and an output;
the signal output of said horizontal delay line connected to the signal input of said horizontal inhibit gate; and
the output of said second OR gate connected to the inhibit input of said horizontal inhibit gate.

16. Apparatus as claimed in claim 15 including:
a high level threshold detector;
a low level threshold detector;
said high and low level threshold detectors connected in parallel between said detecting means and the inputs to said first OR gate and said vertical delay line;
a first AND gate;
a vertical monostable multivibrator;
said first AND gate and said vertical monostable multivibrator connected in series between the output of said first OR gate and the inhibit input of said vertical inhibit gate;
a second AND gate connected between the signal output of said vertical delay line and the signal input of said vertical inhibit gate;
a third AND gate connected between the signal output of said vertical delay lines and the common input to said second OR gate and said horizontal delay line;
a horizontal monostable multivibrator connected between the output of said second OR gate and the inhibit input of said horizontal inhibit gate;
a fourth AND gate connected between the signal output of said horizontal delay line and the signal input of said horizontal inhibit gate;
said low level threshold detector, said first and third AND gates each having an input adapted for connection to a first type clock pulse source; and
said high level threshold detector, said second and fourth AND gates each having an input adapted for connection to a second type clock pulse source.

References Cited

UNITED STATES PATENTS

| | | | |
|---|---|---|---|
| 2,932,006 | 4/1960 | Glauberman | 250—208 X |
| 3,144,555 | 8/1964 | Aroyan et al. | 250—83.3 |

JAMES W. LAWRENCE, *Primary Examiner.*

E. R. LA ROCHE, *Assistant Examiner.*

U.S. Cl. X.R.

250—83.3, 203, 214; 340—146.3